Patented Feb. 7, 1950

2,496,842

UNITED STATES PATENT OFFICE 2,496,842

CYANINE DYE INTERMEDIATES CONTAINING AN ARYLOXY-, ARYLTHIO- OR ARYLSELENOALKYL - P - TOLUENESULFONATE GROUP ATTACHED TO THE NITROGEN ATOM THEREOF

Alfred W. Anish, Vestal, N. Y., assignor to General Aniline & Film Corporation, New York, N. Y., a corporation of Delaware No Drawing. Application August 9, 1947, Serial No. 767,846

4 Claims. (Cl. 260—298)

1

This invention relates to heterocyclic nitrogenous cyanine dye intermediates containing a new group attached to the nitrogen atom thereof.

The use of sensitizing dyes, particularly in multi-layer color film, poses many problems. It is known that sensitizing dyes operate by dyeing the silver-halide grain. To do this, they must be adsorbed to the silver-halide. If they are displaced from the silver-halide grains they lose their sensitizing power. It is also known that many color-formers used in color photography have greater affinity for silver-halides than the sensitizers, and act to displace the same from the silver-halide grains. One must, therefore, select a sensitizer which will not be so displaced.

Another problem arises as regards the migration of the sensitizers from one emulsion to another. Where this ensues, color distortion is the inevitable result. Many proposals have been made dealing with the anchoring of color-forming compounds in silver-halide emulsions, the most noteworthy being the use of a long alkyl chain (see Wilmanns et al. United States Patent 2,186,849).

It is, therefore, necessary when providing sensitizers, particularly for color photography, to make certain that they have (1) the proper sensitizing power, (2) the ability to withstand displacement from silver-halide grains by color-formers, and (3) the ability to resist diffusion from one sensitizing emulsion to another.

Efforts which satisfy the last prerequisite, unfortunately, often lead to compounds which will not meet the first two tests. Thus, it is known that the sensitizing power of cyanine dyes varies with the substituent on the cyanine N-atoms. Where this substituent is alkyl, the power decreases as the chain length increases. Hence, if a long alkyl chain be used to anchor the dye in the emulsion as per Wilmanns, we end up with a product of little or no sensitizing power. The use of other expedients to anchor the dye, on the other hand, often gives products incapable of withstanding the displacement action of color-formers insofar as the silver-halide grains are concerned. It is thus manifest that the provision of sensitizers having the necessary prerequisites is a difficult problem, to say the least.

It is known that many dyestuffs, containing a hydroxyalkyl, alkoxyalkyl, acyloxyalkyl, benzyl, β-ethoxyethyl and similar groups as substituents on one or two of the cyanine N-atoms, have been utilized in the photographic art as sensitizing dyes. Although such dyes are satisfactory from the standpoint of solubility and sensitivity, all of them, however, are deficient from the standpoint of diffusibility. Thus, the hydroxyalkyl group is hydrophilic and lends water solubility. Such groups, however, do not prevent diffusion as this is a characteristic imparted by hydrophobic groups as is evident from Wilmanns. Any attempt to cure this deficiency by the introduction of substituents changing the dye molecule necessarily causes a modification of the sensitizing characteristics.

It is recognized in the art that the greater the molecular weight of the substituent on a cyanine dye, whether it be on the cyanine N-atom, polymethine chain or azole nucleus, the lower its solubility; discounting, of course, the presence of solubilizing groups. Hence, if a sensitizing dye is deficient from the standpoint of diffusibility and satisfactory from the standpoint of solubility, a change in the size of the dye molecule to cure the deficiency causes a lessening of solubility.

It is an object of the present invention to provide a new class of cyanine dye intermediates containing an aryloxyalkyl, arylthioalkyl and arylselenoalkyl - p - toluenesulfonate group attached to the nitrogen atom thereof.

Other objects and advantages of this invention will become apparent by reference to the following specification, in which its preferred details and embodiments are described.

I have discovered that by reacting a 5-membered or 6-membered nitrogenous heterocyclic base, having a reactive group in the 2-position of the nitrogen atom thereof with an aryloxyalkyl, arylthioalkyl or arylselenoalkyl-p-toluenesulfonate, cyanine dye intermediates are obtained, which undergo the usual reactions for the preparation of cyanine dyes and yield sensitizing dyes of increased molecular bulk and having new desirable properties. The dyes prepared from such intermediates are characterized, not only by their speed and gradation, but also by their non-diffusing properties in multi-layer film without any sacrifice in sensitivity. In other words, the sensitizing dyes and dye salts prepared from these intermediates do not lose their power of sensitization, nor are they materially effected in speed by the substitution of the aryloxyalkyl, arylthioalkyl, or arylselenoalkyl group on the cyanine nitrogen atom. Moreover, they have the advantage in that they do not wander or diffuse when utilized in multi-layer coatings, nor are they displaced from the silver-halide grains by the presence of a color-former.

The sensitizing dye intermediates, prepared in accordance with the present invention, are characterized by the following general formulae:

(1)

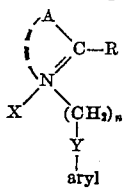

and (2)

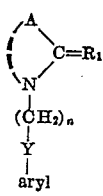

wherein A represents the atoms necessary to complete a 5-membered or 6-membered heterocyclic nitrogenous nucleus of the type usual in cyanine dyes, such as benzoxazole, benzothiazole, benzoselenazole, methylenedioxybenzothiazole, methylenedioxybenzoxazole, indolenine, naphthoxazole, naphthothiazole, oxazole, oxazoline, pyridine, quinoline, selenazole, selenazoline, thiazoline, thiodiazole, and the like, R represents a methyl anilinovinyl, acylanilidovinyl, e. g., acetanilidovinyl, etc., alkylthio, e. g., methylthio, ethylthio, arylthio, e. g., phenylthio, etc., alkyl- or arylthiovinyl, e. g., ethylthiovinyl, phenylthiovinyl, and the like, or halogenovinyl group, e. g., 2-chlorovinyl, 2-bromovinyl, etc., $R_1$ represents a methylene, formylmethylene, formylpropenylidene or acylmethylene group, e. g., acetylmethylene, etc. group, X represents an anionic acid radical, e. g. Cl, Br, I, $ClO_4$ $SO_4CH_3$, $SO_4C_2H_5$, $SO_3C_6H_4CH_3$, and the like, Y represents either oxygen, sulfur or selenium, and $n$ represents 2 or 3. The "aryl" group is either a phenyl or naphthyl group, or a phenyl group substituted by a methyl, methoxy or a branched aliphatic chain, such as di-isopropyl, di-isobutyl, tert.-butyl, and the like, or cycloaliphatic, such as cyclohexyl and the like.

The sensitizing dye intermediates, characterized by the preceding formulae, are employed in the preparation of sensitizing dyestuffs as described in my copending patent application, Serial No. 638,493, filed on December 29, 1945, now Patent No. 2,481,464 of September 6, 1949.

The sensitizing dye intermediates are prepared by alkylating or quaternizing any one of the nitrogenous heterocyclic bases, containing the customary reactive group in 2-position of the nitrogen atom thereof, usually employed in the synthesis of cyanine dyes, with an aryloxyalkyl, arylthioalkyl, or arylselenoalkyl-p-toluenesulfonate, in the known manner, such as by heating in a sealed tube at a temperature ranging from 65° to 150° C. Another method consists of heating said ester and base at about 100° C., with a solvent-diluent, for a time sufficient for quaternization to take place.

The said esters, utilized in the quaternization of said bases, are characterized by the following general formula:

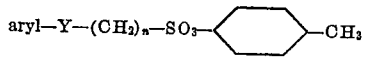

wherein aryl, Y and $n$ have the same values as given above. These esters are prepared by treating p-toluenesulfonyl chloride, in the presence of a base such as pyridine or caustic soda, with an aryloxyalcohol, e. g., β-phenyloxyethyl alcohol, β-(p-tert.-butylphenoxy) ethyl alcohol, β-(p-diisobutylphenoxy) ethyl alcohol, β-(p-methylphenoxy) ethyl alcohol, β-(p-chlorophenoxy)-ethyl alcohol, β-(phenylphenoxy) ethyl alcohol, and the like, arylthioalkyl alcohol, e. g., β-phenylthioethyl alcohol, etc., arylselenoalkyl alcohol, e. g., β-phenylselenoethyl alcohol and the like. The methods for preparing these alcohols have been described in the literature, and no further details need be given here. In general, however, the aryloxyalkyl alcohols are prepared by treating a substituted or unsubstituted phenol or naphthol with ethylene chlorohydrine in the presence of alkali, and the arylthio- and arylselenoalkyl alcohols are prepared by treating thio- or selenophenols with a halohydrin such as ethylene chlorohydrin, trimethylene chlorohydrin, etc., in the presence of sodium alcoholate.

The following examples describe in detail the methods for preparing the quaternizing agents and cyanine dye intermediates quaternized with said agents, but it is to be understood that they are presented merely for the purpose of illustration and are not to be construed as limitative.

EXAMPLE I

β - (p - tert. - butylphenoxy) ethyl p-toluenesulfonate

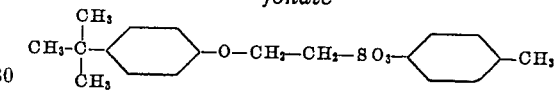

19.4 grams (0.1 mol) of β-(p-tert.-butylphenoxy)-ethyl alcohol were dissolved in 32 grams of pyridine, and 20.9 grams (0.11 mol) of p-toluenesulfonyl chloride were added while stirring. The temperature was kept below 5° C. while adding the latter reagent and the stirring was continued for an additional 3 hours at a temperature under 20° C. After standing for 12 hours, the reaction solution was poured into 60 cc. of concentrated hydrochloric acid diluted with 140 cc. of water. The white solid was filtered off, washed with 2 N sodium hydroxide solution and finally with cold water. After drying, the solid was recrystallized from petroleum ether.

EXAMPLE II

The following aryloxyalkyl p-toluenesulfonates were prepared while utilizing the procedure of the foregoing example:

Phenoxyethyl p-toluenesulfonate
Phenylthioethyl p-toluenesulfonate
Phenylselenoethyl p-toluenesulfonate
β-(p-Di-isobutylphenoxy) ethyl p-toluenesulfonate
β-(p-Methylphenoxy) ethyl p-toluenesulfonate
β-(p-Cyclohexylphenoxy) ethyl p-toluenesulfonate
β-(p-Chlorophenoxy) ethyl p-toluenesulfonate
β-(p-Phenylphenoxy) ethyl p-toluenesulfonate

EXAMPLE III 2-methylbenzothiazole β-phenoxyethyl p-toluenesulfonate

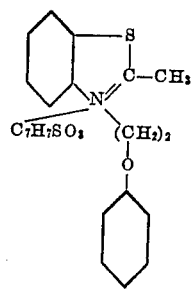

Equal parts by weight of 2-methylbenzothiazole and β-phenoxyethyl p-toluenesulfonate were heated together in an oil bath at 130–140° C., for 16 hours. A mixture of dry acetone and dry ethyl ether was added to the cooled reaction mixture. The solid which separated out was filtered off and air dried.

EXAMPLE IV

*2-methyl-5,6-methylenedioxybenzothiazole β-phenylthioethyl p-toluenesulfonate*

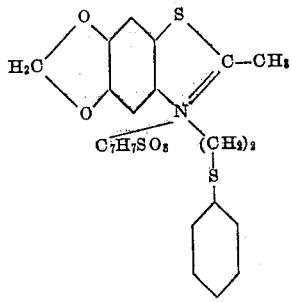

Equal parts by weight of β-phenylthioethyl p-toluenesulfonate and 2-methyl-5,6-methylenedioxybenzothiazole were heated 12 hours at 130–140° C., and then washed with a mixture of dry ether and dry acetone.

EXAMPLE V

*2-methylbenzoselenazole β-phenylselenoethyl p-toluenesulfonate*

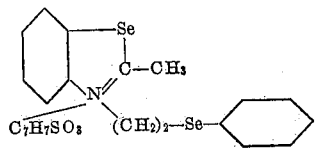

Equimolecular parts of 2-methylbenzoselenazole and β-phenylselenoethyl p-toluenesulfonate were reacted together following the procedure of Example IV.

The quaternary cyanine dye salt intermediates, prepared in accordance with Examples III to V, can be readily converted into other more insoluble quaternary salts as, for example, the aryloxyalkyl, arylthioalkyl, and arylselenoalkyl halides, perchlorates, thiocyanates, oxalates, etc. This may be effected by treating solutions of the aforementioned toluenesulfonates with solutions of soluble halides or perchlorates, such as, potassium bromide or iodide or sodium perchlorate.

EXAMPLE VI 5 grams of the dye salt intermediate, prepared according to Example III, were dissolved in 50 cc. of water and the aqueous solution treated with 20 cc. of a 50% aqueous solution of potassium iodide. From this solution, 2-methylbenzothiazole phenoxyethyl iodide separated out.

The dye intermediates, illustrated by the general formula (1), wherein R represents an acylanilidovinyl group, may be obtained by treating the corresponding quaternized 2-methyl-azole with diphenylformamidine, or the hydrochloride thereof, in the presence of acetic anhydride. When the same quaternized 2-methyl-azoles are treated with these compounds, in the absence of acetic or propionic, anhydride, dye salt intermediates, corresponding to formula (1) wherein R represents an anilidovinyl, are obtained. In the latter case, the treatment is carried out in the presence of a diluent such as alcohol, or by dry fusion.

The following example illustrates the preparation of a dye intermediate containing an acylanilido group in 2-position.

EXAMPLE VII

*2-(β-acetanilidovinyl) benzothiazole β-phenoxyethyl p-toluene-sulfonate*

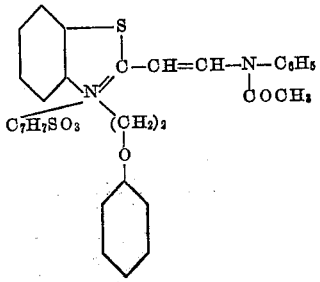

8.82 grams of 2-methylbenzothiazole β-phenoxyethyl p-toluenesulfonate, prepared according to Example III, 3.9 grams of diphenylformamidine, and 40 cc. of acetic anhydride were heated under reflux for about 1 hour.

The corresponding iodide is obtained by substituting 2-methylbenzothiazole β-phenoxyethyl iodide for 2-methylbenzothiazole β-phenoxyethyl p-toluenesulfonate in the foregoing example.

Compounds of the structural formula, (1), wherein R represents an alkylthio or arylthio group, may be prepared by quaternizing the corresponding dye bases as illustrated in the following examples.

EXAMPLE VIII

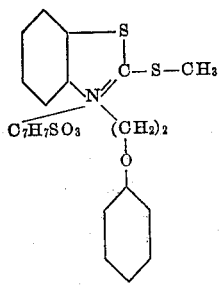

Equal parts by weight of 2-methylmercaptobenzothiazole and β-phenoxyethyl p-toluenesulfonate were heated together in an oil bath at 130–140° C. for 16 hours. A mixture of dry acetone and dry ethyl ether was added to the cooled reaction mixture.

If, instead of 2-methylmercaptobenzothiazole in Example VIII, there is employed 2-phenylmercaptobenzothiazole, a compound is obtained in which the CH₃ group is replaced by C₆H₅.

The compounds of formula (1) wherein R represents a methyl group may be readily converted into the corresponding compounds wherein R is

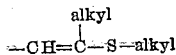

by treating the quaternized 2-methyl-azole with ethylisothioacetanilide in the presence of acetic anhydride, as shown in the following example.

EXAMPLE IX

A mixture of 1 mol of 2-methylbenzothiazole β-phenoxyethyl p-toluenesulfonate, and 1½ mols of ethylisothioacetanilide and acetic anhydride were refluxed for 4 hours, after which there was obtained a compound having the following formula:

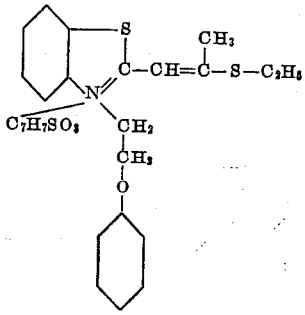

Compounds of structural formula (2), wherein R₁ represents a =CH—CHO or
=CH—CH=CH—CHO
group, can be obtained by hydrolyzing, in an alkaline medium, compounds of formula (1) wherein R represents an acylanilidovinyl and acylanilidobutadienyl group, respectively. The following example is illustrative of this procedure.

EXAMPLE X 10 grams of 2-(β-acetanilidovinyl) benzothiazole β-phenoxyethyl iodide (Example VII) were hydrolyzed with a solution of potassium hydroxide in 95% alcohol. A compound having the following formula was obtained:

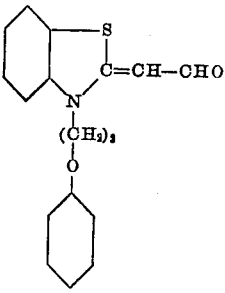

Compounds of structural formula (2), wherein R₁ represents an acylmethylene group, may be obtained by treating the compounds of formula (1), wherein R represents a methyl group, with an acyl halide, such as acetyl chloride, in the presence of an acid binding agent as, for instance, pyridine. Illustrative of the production of such compounds is the following example.

EXAMPLE XI 1 mol of 2-methylbenzothiazole β-phenoxyethyl iodide was suspended in one liter of pyridine. The suspension was cooled to below 10° C., and there was added, gradually with stirring, about 1.25 mols of acetyl chloride. The reaction mixture was allowed to stand at below 10° C. for about 30 minutes, at room temperature for another 30 minutes, and finally heated at 100° C. for about 20 minutes. The pyridine was evaporated under reduced pressure, the residue stirred with cold water, filtered and dried. There was obtained a product having the following formula:

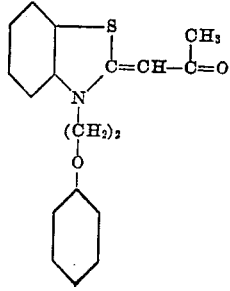

By treating the foregoing acylmethylene derivatives with a phosphorus oxyhalide, advantageously, but not necessarily, in the presence of a diluent, such as alcohol, while preferably chilling the reaction mixture, there were obtained compounds of formula (1) where R is a halogenovinyl group, such as, for example

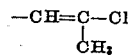

Illustrative of the production of such compounds is the following example.

EXAMPLE XII 1 mol of 2-acetylmethylene-3-(β-phenyloxyethyl) benzothiazoline (Example XI) was dissolved in benzene, and the solution chilled to about 5° C. There was added, with stirring to the chilled solution, about 1.5 mols of phosphorus oxychloride. Upon further stirring and completion of the reaction, a solid product was obtained which was washed with benzene and dry diethyl ether. The product had the following formula:

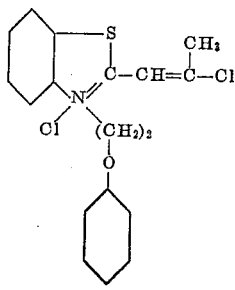

In a similar manner, there can be employed in place of 2-acetylmethylene-3-(β-phenyloxyethyl) benzothiazoline, an equivalent amount of 2-acetylmethylene-3-(β- phenylthioethyl) benzothiazoline, 2 - acetylmethylene-3 - (β - phenylselenoethyl) benzoselenazoline, and 2-acetylmethylene derivatives of other 5-membered or 6-membered heterocyclic nitrogen bases, having attached to the nitrogen atom an aryloxyalkyl, arylthioalkyl or arylselenoalkyl radical.

From the foregoing examples, it is apparent that a large number of variety of compounds of the structure of formulae (1) and (2) can be produced. The above examples are not intended to be limiting but illustrative of the type of compounds that can be prepared. Various modifications will readily occur to those skilled in the art.

This application is a continuation-in-part of my application Serial No. 638,494, filed on December 29, 1945, now abandoned.

I claim:

1. Heterocyclic nitrogenous sensitizing dye intermediates selected from the class consisting of those characterized by the following general formulae:

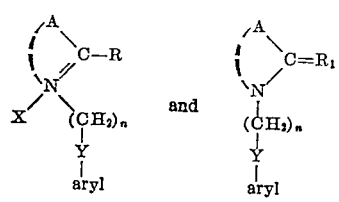

wherein A represents the atoms necessary to complete a heterocyclic nitrogenous nucleus of the type usual in cyanine dyes, R represents a member of the class consisting of methyl, anilinovinyl, acylanilidovinyl, alkylthio, arylthio, alkylthiovinyl, arylthiovinyl, and halogenovinyl groups, $R_1$ represents a member selected from the class consisting of methylene, formylmethylene, formylpropenylidene, and acylmethylene groups, X represents an anionic acid radical, Y represents a member selected from the class consisting of oxygen, sulfur and selenium, and $n$ represents a number taken from the group of 2 and 3.

2. A heterocyclic nitrogenous cyanine dye intermediate having the following formula:

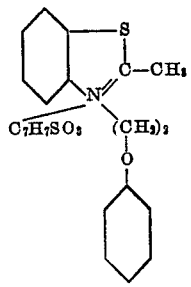

3. A heterocyclic nitrogenous cyanine dye intermediate having the following formula:

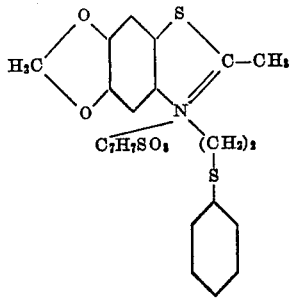

4. A heterocyclic nitrogenous cyanine dye intermediate having the following formula:

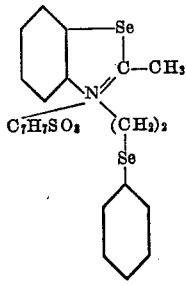

ALFRED W. ANISH.

REFERENCES CITED

The following references are of record in the file of this patent:

UNITED STATES PATENTS

| Number | Name | Date |
| --- | --- | --- |
| 2,231,659 | Brooker | Feb. 11, 1941 |